United States Patent [19]

Murakami et al.

[11] Patent Number: 5,576,849
[45] Date of Patent: Nov. 19, 1996

[54] IMAGE DATA TRANSFORMATION APPARATUS AND IMAGE ENTRY APPARATUS

[75] Inventors: Tatsuya Murakami, Tachikawa; Eiichi Hadano, Kokubunji; Kazuyuki Kodama, Nishitama-gun; Hiromichi Fujisawa, Tokorozawa; Masaaki Fujinawa, Odawara, all of Japan

[73] Assignee: Hitachi, Ltd., Tokyo, Japan

[21] Appl. No.: 400,385

[22] Filed: Mar. 3, 1995

Related U.S. Application Data

[63] Continuation of Ser. No. 890,709, May 29, 1992, abandoned, which is a continuation-in-part of Ser. No. 479,615, Feb. 13, 1990, Pat. No. 5,128,748.

[30] Foreign Application Priority Data

May 29, 1991 [JP] Japan ..................... 3-124271

[51] Int. Cl.⁶ ............................................. H04N 1/46
[52] U.S. Cl. ..................... 358/450; 358/456; 358/500; 358/462
[58] Field of Search ....................... 358/450, 455, 358/456, 462, 534, 500, 518, 459; H04N 1/46

[56] References Cited

U.S. PATENT DOCUMENTS

| | | |
|---|---|---|
| 4,893,188 | 1/1990 | Murakami et al. |
| 4,953,012 | 8/1990 | Abe ........................................ 348/462 |
| 5,128,748 | 7/1992 | Murakami et al. ....................... 358/75 |

*Primary Examiner*—Safet Metjahic
*Attorney, Agent, or Firm*—Antonelli, Terry, Stout & Kraus

[57] ABSTRACT

Monochrome multi-color, and full-color documents are automatically discriminated from each other, and character and photograph regions are also determined in an automatic manner, thereby producing appropriate binary image data according to the operation results. An image data transformation apparatus includes a binarizing section for converting image data inputted thereto into binary image data associated with a plurality of different colors, binary image data buffers for temporarily storing therein the binary image data, a decision section for deciding based on the input image data whether the monochrome, color, or multi-color output is to be produced and whether an intermediate-tone or particular color pixel is to be processed, and a binary image data selection/output section for selecting as output therefrom binary image data according to the decision results.

37 Claims, 14 Drawing Sheets

FIG. 3
P1
MONOCHROME
CHARACTER
DOCUMENT
OR
MULTI-COLOR
CHARACTER
DOCUMENT
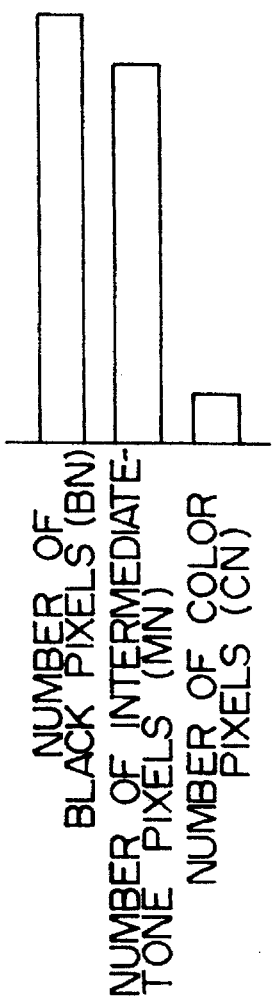
P2
MONOCHROME
PHOTOGRAPH
MIXED
DOCUMENT
OR
MULTI-COLOR
PHOTOGRAPH
MIXED
DOCUMENT
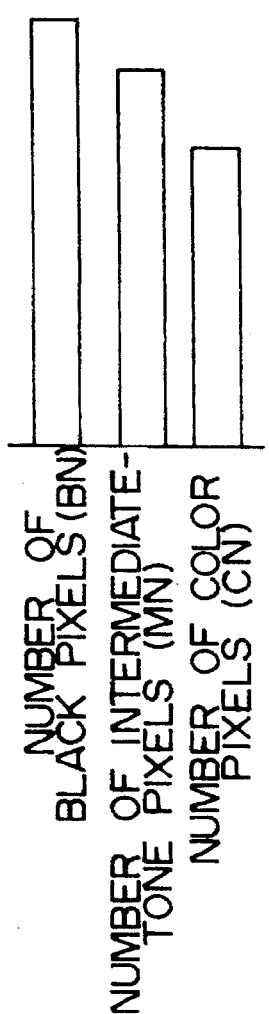
P3
FULL-COLOR
DOCUMENT

FIG. 4

| Fmd | Fcm | Fdc | Q | CONTENTS OF CODE |
|---|---|---|---|---|
| 0 | 0 | 0 | 0 | MONOCHROME BINARY |
|   |   | 1 | 1 | MONOCHROME DITHER |
|   | 1 | 0 | 0 | MONOCHROME BINARY |
|   |   | 1 | 1 | MONOCHROME DITHER |
| 1 | 0 | 0 | 2 | COLOR BINARY |
|   |   | 1 | 3 | COLOR DITHER |
|   | 1 | 0 | 3 | COLOR DITHER |
|   |   | 1 | 3 | COLOR DITHER |

FIG. 5

| Q | OUTPUT DATA | | |
|---|---|---|---|
| | R | G | B |
| 0 | — | BIN_G | — |
| 1 | — | DIT_G | — |
| 2 | BIN_G | BIN_G | BIN_G |
| 3 | DIT_R | DIT_G | DIT_B |

DIT: DITHERED OUTPUT
BIN: BINARIZED OUTPUT

FIG. 8
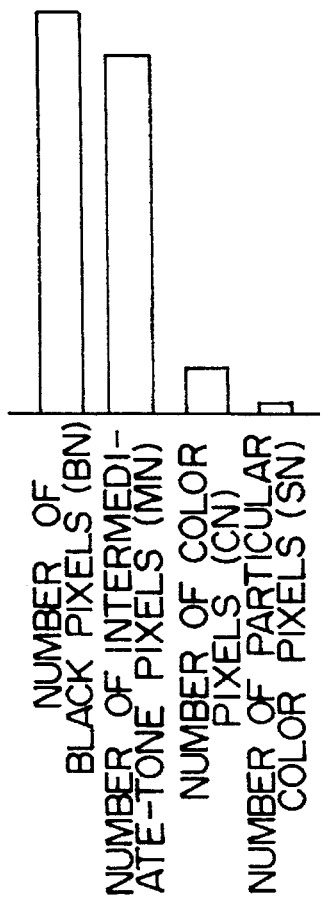
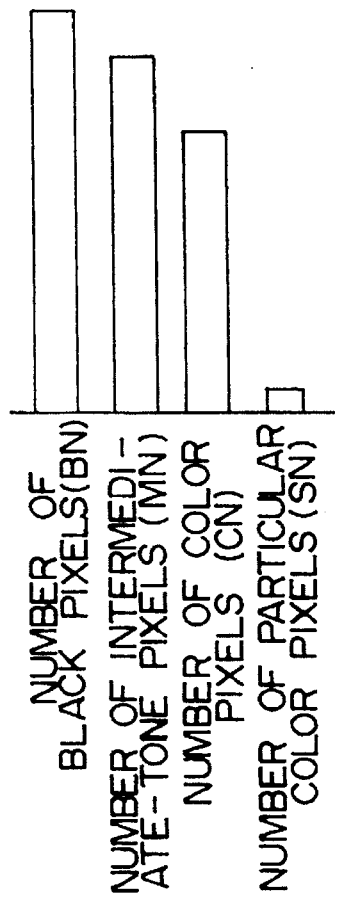

FIG. 9
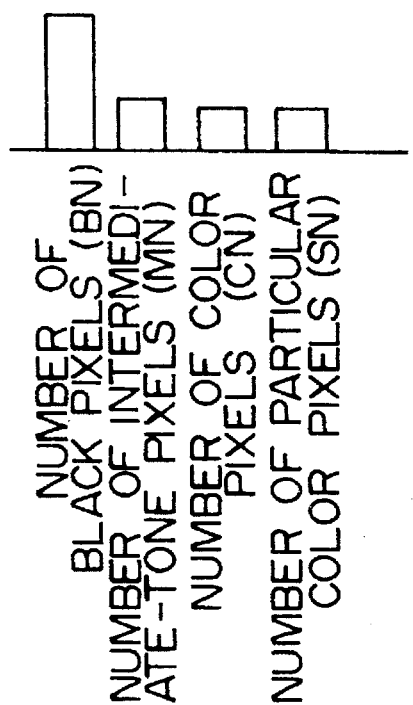
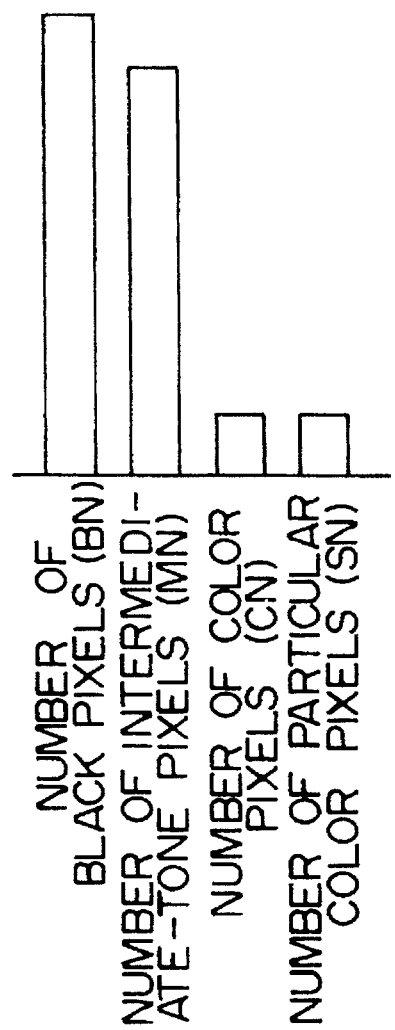

FIG. 10

| Fmd | Fcm | Fdc | Fsc | Q | CONTENTS OF CODE |
|---|---|---|---|---|---|
| 0 | 0 | 0 | x | 0 | MONOCHROME BINARY |
|   |   | 1 | x | 1 | MONOCHROME DITHER |
|   | 1 | 0 | x | 0 | MONOCHROME BINARY |
|   |   | 1 | x | 1 | MONOCHROME DITHER |
| 1 | 0 | 0 | x | 2 | COLOR BINARY |
|   |   | 1 | x | 3 | COLOR DITHER |
|   | 0 | 0 | x | 3 | COLOR DITHER |
|   |   | 1 | x | 3 | COLOR DITHER |
| 2 | 0 | 0 | 0 | 0 | MONOCHROME BINARY |
|   |   |   | 1 | 4 | MULTI-COLOR BINARY |
|   |   | 1 | 0 | 1 | MONOCHROME DITHER |
|   |   |   | 1 | 5 | MULTI-COLOR DITHER |
|   | 1 | 0 | 0 | 0 | MONOCHROME BINARY |
|   |   |   | 1 | 4 | MULTI-COLOR BINARY |
|   |   | 1 | 0 | 1 | MONOCHROME DITHER |
|   |   |   | 1 | 5 | MULTI-COLOR DITHER |

FIG. 11

| Q | OUTPUT DATA | | |
|---|---|---|---|
| | R | G | B |
| 0 | — | BIN_G | — |
| 1 | — | DIT_G | — |
| 2 | BIN_G | BIN_G | BIN_G |
| 3 | DIT_R | DIT_G | DIT_B |
| 4 | BIN_G | BIN_G | |
| 5 | DIT_G | DIT_G | |

DIT: DITHERED OUTPUT
BIN: BINARIZED OUTPUT

IMAGE DATA TRANSFORMATION APPARATUS AND IMAGE ENTRY APPARATUS

This application is a continuation of application, Ser. No. 07/890,709, filed on May 29, 1992, now abandoned which is a continuation-in-part of application Ser. No. 07/479,615, filed Feb. 13, 1990, now U.S. Pat. No. 5,128,748.

CROSS-REFERENCE TO RELATED APPLICATIONS

The present invention is related to the U.S. application Ser. No. 07/479,615 filed Feb. 13, 1990, now U.S. Pat. No. 5,128,748the U.S. application (corresponding to PCT JP 90/01630, filed Dec. 13, 1990), and the U.S. application Ser. No. 07/782,096 filed Sep. 24, 1991, now abandoned.

The disclosure of application Ser. No. 479,615, filed Feb. 13, 1990 now U.S. Pat. No. 5,128,748 is incorporated herein by reference.

BACKGROUND OF THE INVENTION

The present invention relates to an image data transformation apparatus and an image entry apparatus, and in particular, to an image data transformation apparatus for transforming multi-value color image data into binary image data and an image entry apparatus for reading a document to store binary image data thereof.

Conventionally, there have been commonly known an image filing system and a facsimile apparatus in which multi-value image data having multiple values is read by a scanner to be converted into binary image data, thereby accumulating and/or transmitting the resultant binary data.

In a case of a printed matter (to be called a monochrome character document with monochrome meaning a single color) in which black letters are printed on a sheet of white paper, the multi-value image data is constituted with data representing brightness or darkness not including any intermediate gradation or tone. In the transformation of the data, a check is made to decide whether or not the data of each pixel has a value of light intensity higher than a predetermined threshold value, thereby producing binary image data associated therewith.

Moreover, for example, when processing a monochrome photograph (to be called a monochrome photograph document), the multi-value image data is represented as light intensity data representing brightness and darkness of associated pixels and including intermediate gradation or tone levels. Consequently, there is employed a method such as a dithering method to convert the multi-value image data into binary image data.

In addition, for example, in a case where the transformation is accomplished on a printed matter (to be called a multi-color character document with multi-color meaning a plurality of colors but not full-color) in which, for example, black and red characters are printed on a sheet of white paper, the multi-value image data is constituted with light intensity data not including any intermediate gradation level in which the black characters are not discriminated from the red characters and with light intensity data which not including any intermediate gradation level which relates only to red character portions. Consequently, a check is made to decide whether or not the data of each pixel has a value of light intensity higher than a predetermined threshold value so as to transform the multi-value data into binary image data associated with only red character portions and binary image data in which the black and red characters are not discriminated from each other.

Furthermore, for example, in a case of a color photograph (a document including a color photograph is called a full-color document with color meaning full-color, namely all colors in the color spectrum), multi-value image data is constituted with light intensity data having intermediate tones only related to red portions, light intensity data having intermediate tones only related to green portions, and light intensity data having intermediate tones only related to blue portions. In consequence, the multi-value image data is converted, for example, by a dithering method into binary image data groups related only to red, green, and blue portions, respectively.

As above, the transformation method of transforming the multi-value data into binary data varies depending on the kinds or types of document. Consequently, prior to the read operation of the scanner for reading the document, it has been a common practice that the operator decides the kind of the objective document to input the document kind to the image filing system and/or the facsimile apparatus.

In the prior art, as described above, the operator determines the type of the objective document to specify the kind of multi-value image data and a method of converting the multi-value image into binary image data, which consequently leads to problems that the operations are complicated and the processing speed is decreased.

SUMMARY OF THE INVENTION

It is therefore an object of the present to provide an image data transformation apparatus and an image entry apparatus in which the kind of document can be automatically determined without scanning the document in advance.

According to the first aspect of the present invention, there is provided an image data transformation apparatus comprising binarizing means for converting image data inputted thereto into binary image data associated with a plurality of different colors, binary image data buffer means for temporarily storing therein the binary image data, monochrome/color decision means for deciding based on the inputted image data whether a monochrome output or a color output is to be produced, and binary image data selection/output means for reading, for the monochrome output, from the binary image data buffer means a data item of the binary image data associated with the plural colors and for reading from the binary image data buffer means, for the color output, at least two data items of the binary image data associated with the plural colors, thereby outputting the attained data.

According to the second aspect of the present invention, there is provided an image data transformation apparatus comprising simple binarizing means for converting image data inputted thereto into binary image data with a tone thereof not being taken into consideration, quasi-tone binarizing means for converting image data inputted thereto into binary image data with a tone thereof taken into consideration, binary image data buffer means for temporarily storing therein the binary image data, monochrome/color decision means for deciding based on the inputted image data whether a monochrome output or a color output is to be produced, character/photograph decision means for deciding based on the inputted image data whether a character area output or a photograph area output is to be produced, and binary image data selection/output means for reading, for the monochrome output and the character region output, from the binary image data buffer means binary image data associated with the plural colors and converted by the simple binarizing means, for reading, for the monochrome output and the photograph region output, from the binary image data buffer means binary image data associated with the plural colors and converted by said quasi-tone binarizing means, and for reading, for the color output, from the binary image data buffer means at least two data items of the binary image data associated with the plural colors and converted by said quasi-tone binarizing means, thereby outputting the attained data.

According to the third aspect of the present invention, there is provided an image data transformation apparatus comprising binarizing means for converting image data inputted thereto into binary image data associated with a plurality of different colors, binary image data buffer means for temporarily storing therein the binary image data, particular color output decision means for deciding whether or not a particular color output is to be created depending on whether or not each pixel of the inputted image data is of a particular color, monochrome/multi-color decision means for deciding based on the inputted image data whether a monochrome output or a multi-color output is to be generated, binary image data selection/output means for reading in any cases from the binary image data buffer means a data item of the binary image data associated with the plural colors, the data item not being related to the particular color, and for reading from the binary image data buffer means, for the particular color output and the multi-color output, binary image data associated with the particular color in addition to the data item thus read, thereby outputting the attained data.

According to the fourth aspect of the present invention, there is provided an image data transformation apparatus comprising binarizing means for converting image data inputted thereto into binary image data associated with a plurality of different colors, binary image data buffer means for temporarily storing therein the binary image data, particular color output decision means for deciding whether or not a particular color output is to be created depending on whether or not each pixel of the inputted image data is of a particular color, color/multi-color decision means for deciding based on the inputted image data whether a color output or a multi-color output is to be generated, binary image data selection/output means for reading, for the color output, from the binary image data buffer means at least two data items of the binary image data associated with the plural colors and for reading from the binary image data buffer means, for the multi-color output and the particular color output, a data item of the binary image data associated with the plural colors and related to the particular color and a data item of the binary image data, the data item being related to another color, thereby outputting the attained data.

According to the fifth aspect of the present invention, there is provided an image data transformation apparatus comprising binarizing means for converting image data inputted thereto into binary image data associated with a plurality of different colors, binary image data buffer means for temporarily storing therein the binary image data, particular color output decision means for deciding whether or not a particular color output is to be created depending on whether or not each pixel of the inputted image data is of a particular color, monochrome/color/multi-color decision means for deciding based on the inputted image data whether a monochrome output, a color output, or a multi-color output is to be generated, binary image data selection/output means for reading, for the monochrome output, from the binary image data buffer means a data item of the binary image data associated with the plural colors, for reading from the binary image data buffer means, for the color output, at least two data items of the binary image data associated with the plural colors, and for reading from the binary image data buffer means, for the multi-color output and the particular color output, a data item of the binary image data associated with the plural colors and related to the particular color and the binary image data read for the monochrome output, thereby outputting the attained data.

According to the sixth aspect of the present invention, there is provided an image entry apparatus, comprising document read/input means for reading a document and for inputting image data thereof, the image data transformation apparatus, and image data storage means for storing therein binary image data selection information and binary image data.

According to the seventh aspect of the present invention, there is provided an image entry apparatus comprising document read/input means for reading a document and for inputting image data thereof, image data transformation means for receiving as input thereto image data, for converting the image data into binary image data, for outputting the binary image data, and for outputting attribute information of the binary image data the attribute information indicating whether the binary image data is monochrome, multi-color or color data, image data storage means for storing therein binary image data and attribute information thereof, and binary image data attribute information display means for displaying the attribute information of the binary image data.

In the image data transformation apparatus and the image entry apparatus according to the present invention, the data binarization is accomplished for a plurality of colors of the inputted image data. Moreover, there are conducted a monotone binarization and a quasi-tone binarization. The resultant binarized image data is temporarily stored in a storage.

Furthermore, in the image data transformation apparatus and the image entry apparatus according to the first to sixth aspects of the present invention, checks are achieved for the inputted image data to determine whether the data is of the monochrome, color, or multi-color image and whether the pixel is of an intermediate tone or of a particular color. According to results of the checks, the binarized data thus stored is selectively read from the storage to be outputted to an external device.

In addition, in the image entry apparatus according to the seventh aspect of the present invention, there is displayed attribute information of the binarized image data. Referring to the attribute information, the user checks to determine whether the data is of the monochrome, color, or multi-color image and whether the pixel is of an intermediate tone or of a particular color, thereby selecting and outputting the stored binary data to an external device.

BRIEF DESCRIPTION OF THE DRAWINGS

These and other objects and advantages of the present invention will become apparent by reference to the following description and accompanying drawings wherein:

FIG. 3 is an explanatory diagram useful to explain patterns associated with various kinds of document;

FIG. 4 is a truth table for use in a domain decision result selecting section of the embodiment;

FIG. 5 is an explanatory diagram for explaining correspondences between a data selection code Q and output data;

FIG. 8 is an explanatory diagram useful to explain patterns associated with various kinds of document;

FIG. 9 is an explanatory diagram useful to explain patterns associated with various kinds of document;

FIG. 10 is a truth table for use in a domain decision result selecting section of the embodiment;

FIG. 11 is an explanatory diagram for explaining correspondences between a data selection code Q and output data;

DESCRIPTION OF THE PREFERRED EMBODIMENTS

Figure 1:
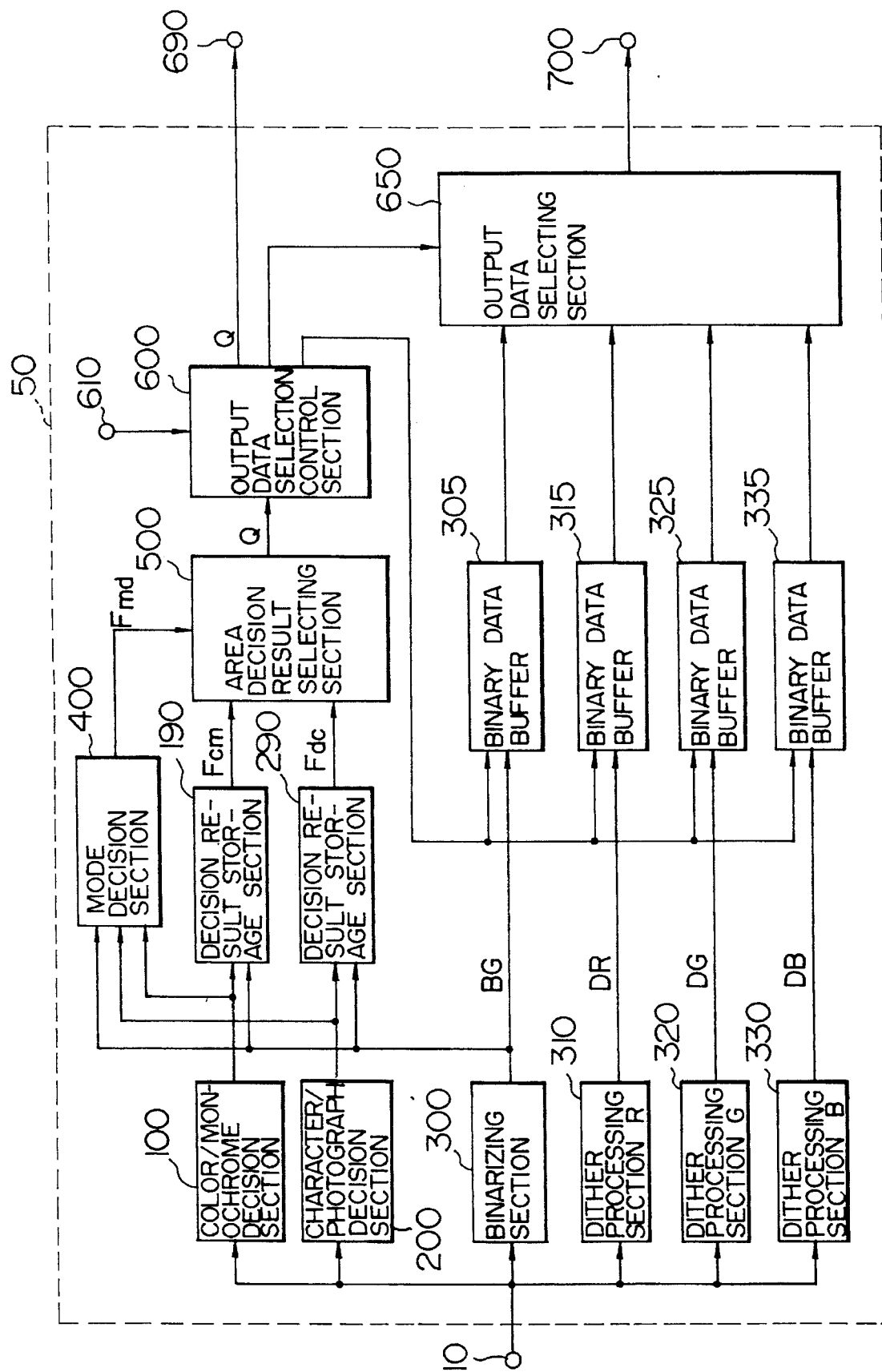
FIG. 1 is a block diagram showing a first embodiment of an image data transformation apparatus in accordance with the present invention.

Referring now to the drawings, description will be given in detail of embodiments according to the present invention, which however is not restricted by the embodiments.

FIG. 1 shows the block configuration of the first embodiment of an image data transformation apparatus 50 according to the present invention.

Multi-value data which is attained from image reader means (not shown) such as a scanner and which includes light intensity data (YR data) including intermediate tones of a red component, light intensity data (YG data) including intermediate tones of a green component, light intensity data (YB data) including intermediate tones of a blue component is supplied to a multi-value image data input section 10.

A color/monochrome decision section 100 computes chroma saturation according to values of respective pixels represented by the YR, YG, and YB data and then compares the value of chroma saturation with a predetermined threshold value, thereby deciding whether each pixel is related to a color or monochrome data. For the color or monochrome data, a flag Fcm is set to 1 or 0, respectively.

The flags Fcm for the pixels of a frame of image are stored in a decision result storage section 190.

A character/photograph decision section 200 decides for each pixel, based on the YR, YG, and YB data or either one thereof, whether the pixel is related to light intensity data which need not be presented with an intermediate tone (the pixel generally is associated with a character region in this case) or to a light intensity data of an intermediate tone (namely, the pixel generally is associated with a photograph region). In the former case, a flag Fdc is set to 1; otherwise, the flag Fdc is set to 0. The decision technology has been described, for example, in the publication of U.S. Pat. No. 4,893,188.

The flags Fdc of a frame of image are stored in a decision result storage section 290.

A binarization processing section 300 decides for each pixel of the YG data whether or not the pixel is brighter than the brightness denoted by a predetermined threshold value to obtain therefrom monochrome binary image data (to be called BG data). In general, the brightness or intensity is computed from the YR, YG, and YB data and then the monochrome binary image data is attained therefrom according to a known binarization method. However, an approximated binarization is adopted in this example.

A dither processing section R 310 processes the YR data in a dither method to obtain binary data (to be called DR data) of red component. In this connection, the dither section 310 may be replaced with a processing section employing a quasi-tone representation processing in place of the dither processing.

A dither processing section G 320 processes the YG data in a dither method to obtain binary data (to be called DG data) of green component.

A dither processing section B 320 processes the YB data in a dither method to obtain binary data (to be called DB data) of blue component.

The BG, DR, DG, and DB data are temporarily stored in binary data buffers 305, 315, 325, and 335, respectively.

Figure 2:
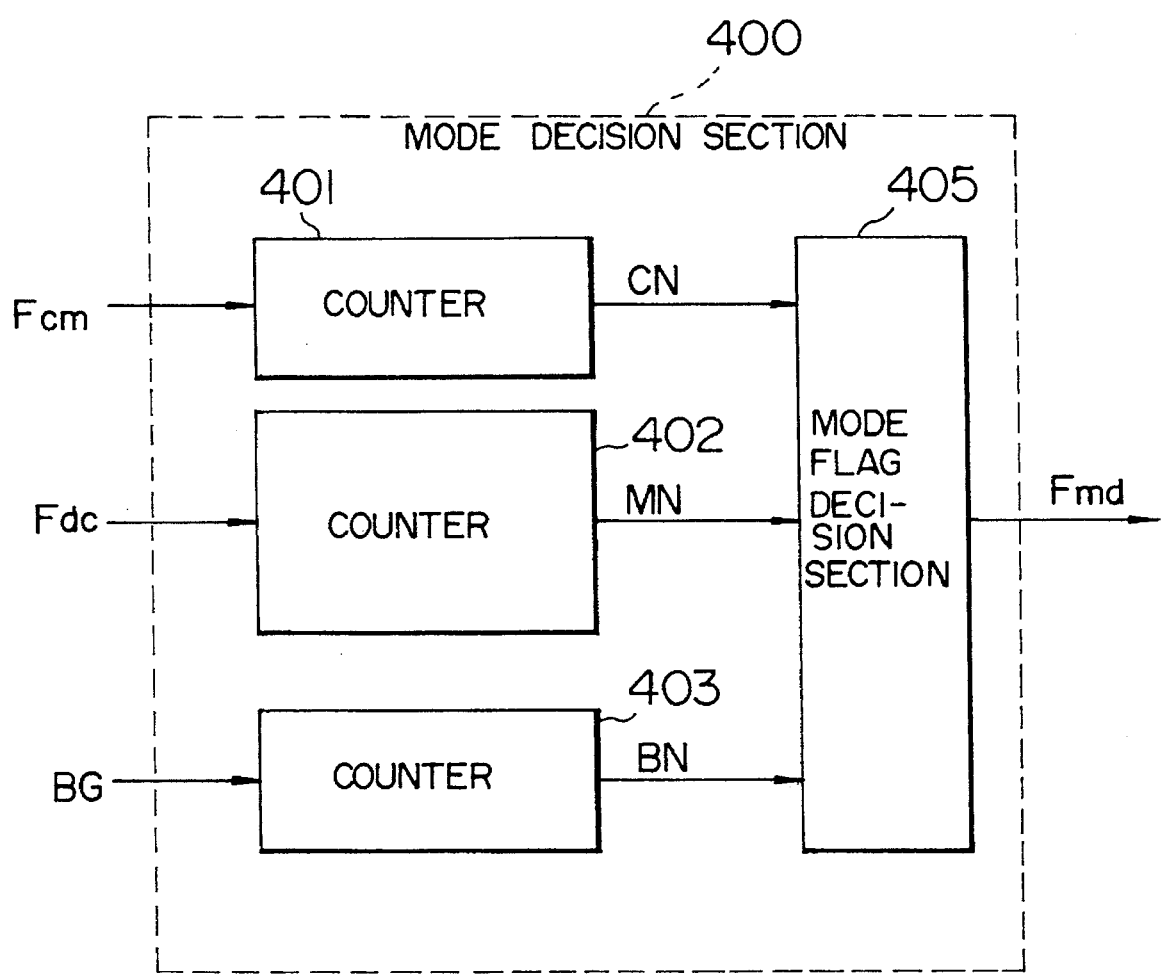
FIG. 2 is a schematic block diagram showing the configuration of a mode decision section of the embodiment.

A mode decision section 400 includes, as shown in FIG. 2, a counter 401 for counting, based on the flags Fcm, the number of color pixels CN for a frame of image, a counter 402 for counting, based on the flags Fdc, the number of intermediate tone pixels MN for a frame of image, a counter 403 for counting, based on the BG data, the number of black pixels BN (pixels not brighter than the brightness indicated by a predetermined threshold) for a frame of image, and a mode flag decision section 405 for deciding, based on the CN/BN and MN/BN values, whether the data is in the monochrome mode or the full-color mode and for setting the flag Fmd to 0 or 1 depending on the decision results in the monochrome or full-color mode, respectively.

For example, in a case of a document of monochrome or multi-color characters, the values of CN/BN and MN/BN are minimized as shown in a pattern P1 of FIG. 3. The data is accordingly decided to be in the monochrome mode. Moreover, in a case of a monochrome or multi-color photograph mixed document, the value of CN/BN is reduced and the value of MN/BN is increased as shown in a pattern P2 of FIG. 3. The data is consequently determined to be in the monochrome mode. In this regard, the multi-color document is processed as a monochrome document in this embodiment.

For a full-color document, the values of CN/BN and MN/BN are increased as shown in a pattern P3 of FIG. 3. The data is therefore assumed to be in the full-color mode.

A region decision result selecting section 500 receives the flags Fcm, Fdc, and Fmd respectively from the decision result storage sections 190 and 290 and the mode decision section 400 to produce a data selection code Q for each pixel according to a table of FIG. 4.

An output data selection control section 600 receives the data selection code Q from the selection section 500 to output according thereto a control signal to an output data selecting section 650. Furthermore, this section 600 sends the data selection code Q to a data selection code output section 690. FIG. 5 shows an example of the operation of the output data selection control section 600.

Figure 6:
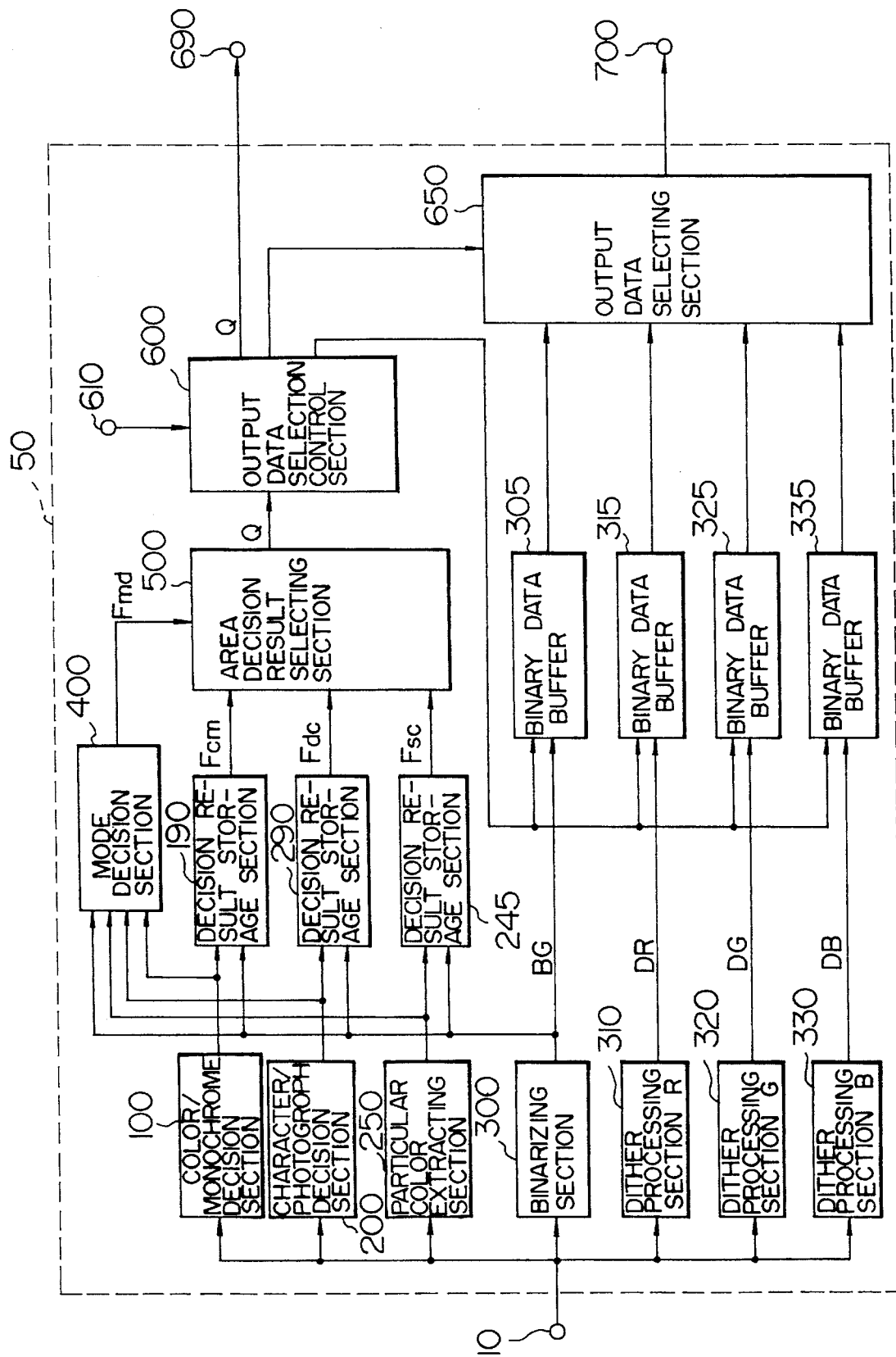
FIG. 6 is a block diagram schematically showing a second embodiment of an image data transformation apparatus in accordance with the present invention.
Figure 7:
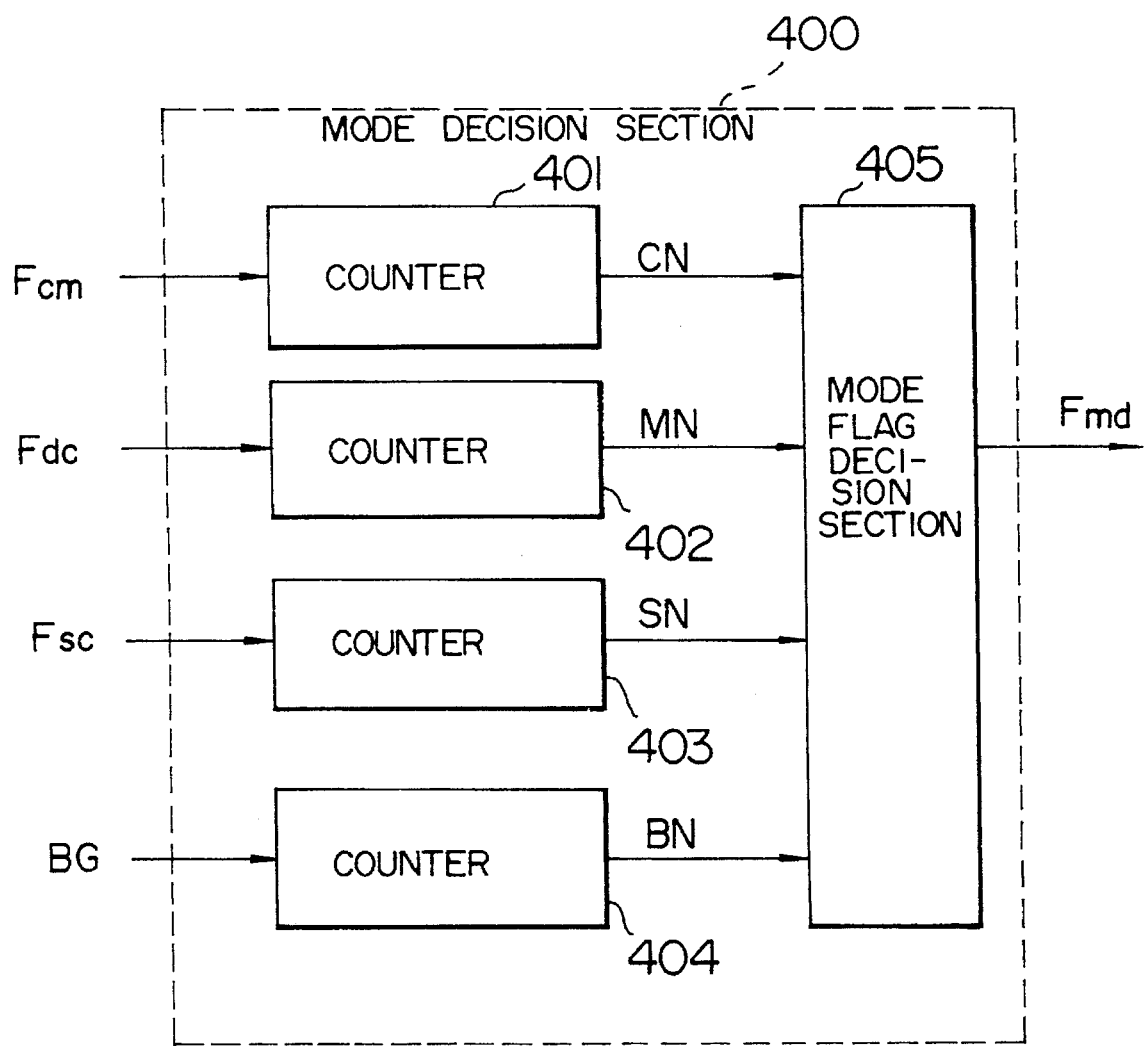
FIG. 7 is a schematic block diagram showing the configuration of a mode decision section of the embodiment.

The output data selecting section 650 selectively reads binary image data from the binary data buffers 305, 315, 325, and 335 as shown in FIG. 6, thereby outputting the attained data to a binary image data output section 700.

As can be seen from Figs. 4 and 5, when the data selection code Q is set to 0, it is indicated to select monochrome binary data. Namely, BIN_G data (BG data) is read from the binary data buffer 305 to be outputted as binary image data associated with green.

Moreover, when the data selection code Q is set to 1, it is denoted to select monochrome dithered data. Namely, DIT_G data (DG data) is read from the binary data buffer 325 to be outputted as binary image data associated with green.

In addition, when the data selection code Q is set to 2, it is designated to select color binary data. Namely, BIN_G data (BG data) is read from the binary data buffer 305 to be outputted as binary image data associated with red, green, and blue.

Furthermore, when the data selection code Q is set to 3, it is indicated to select color dithered data. Namely, DIT_R data (DR data), DIT_G data (DG data), and DIT_B data (DB data) are read respectively from the binary data buffers 315, 325, and 335 to be outputted as binary image data associated with red, green, and blue.

In this connection, the operator may supply an instruction from an instruction input section 610 to the output data selection control section 600, thereby selecting arbitrary binary image data as the output data above.

Next, FIG. 6 shows in a block diagram a second embodiment of the image data transformation apparatus 50 according to the present invention.

The apparatus of this embodiment is different from the image data transformation apparatus of the first embodiment in that the multi-color document is discriminated from the monochrome document.

To this end, the apparatus further includes a particular color extracting section 250 and a storage result decision section 245. In addition, there are accomplished in this embodiment more complicated operations by the mode decision section 400, the area decision result selecting section 500, the output data selection controlling section 600, and the output data selecting section 650.

The particular color extracting section 250 computes a hue from the YR, YG, and YB data. If the hue is within a predetermined range, the flag Fsc is set to 1; otherwise, the flag Fsc is set to 0.

The mode decision section 400 includes a counter 401 for counting the number of color pixels CN for a frame of image based on the flag Fcm, a counter 402 for counting the number of intermediate-tone pixels MN for a frame of image based on the flag Fdc, a counter 403 for counting the number of particular color pixels SN for a frame of image based on the flag Fsc, a counter 404 for counting the number of black pixels (having a value of brightness less than a preset threshold value) BN for a frame of image based on the BG data, and a mode flag decision section 405 for deciding the monochrome, full-color, or multi-color mode according to the values of CN/BN, MN/BN, and SN/BN and for setting the flag Fmd to 0, 1, or 2 when the decision results in the monochrome, full-color, or multi-color mode, respectively.

For example, for a monochrome character document, the values of CN/BN, MN/BN, and SN/BN are minimized as shown in a pattern P11 of FIG. 8. Consequently, the data is determined to be in the monochrome mode.

Moreover, for example, in a case of a monochrome photograph mixed document, the values of CN/BN and SN/BN are decreased and MN/BN is increased as shown in a pattern P12 of FIG. 8. Namely, the data is determined to be in the monochrome mode.

For a full-color document, the values of CN/BN and MN/BN are increased and SN/BN is minimized as shown in a pattern P13 of FIG. 8. Accordingly, the data is determined to be in the full-color mode.

Moreover, for example, in a case of a multi-color character document, the values of CN/BN, MN/BN are decreased and SN/BN are increased as shown in a pattern P14 of FIG. 9. Namely, the data is determined to be in the multi-color mode.

In addition, for example, for a multi-color photograph mixed document, the values of CN/BN and SN/BN are increased and MN/BN is decreased as shown in a pattern P15 of FIG. 9. In consequence, the data is determined to be also in the multi-color mode.

The area decision result selecting section 500 receives the flags Fcm, Fdc, and Fsc from the decision result storage sections 190, 290, and 245 to produce a data selection code Q for each pixel based on a table of FIG. 10.

The output data selection control section 600 outputs a control signal to the output data selecting section 650 according to the data selection code Q from the selecting section 500. The data selection code Q is also sent to the data selection code output section 690.

The output data selecting section 650 shown in FIG. 6 selectively reads binary image data from the binary data buffers 305, 315, 325 and 335 in accordance with, for example, the table shown in FIG. 11, and then outputs the read data to the binary image data output section 700.

As can be appreciated from FIGS. 10 and 11, when the data selection code Q is set to 0, it is indicated to select monochrome binary data and hence BIN_G data (BG data) is read from the buffer 305 to be outputted as binary image data corresponding to green.

Moreover, when the data selection code Q is set to 1, it is denoted to select monochrome dithered data and therefore DIG_G data (DG data) is read from the buffer 325 to be outputted as binary image data corresponding to green.

In addition, when the data selection code Q is set to 2, it is designated to select color binary data and accordingly BIN_G data (BG data) is read from the buffer 305 to be outputted as binary image data corresponding to red, green, and blue.

Furthermore, when the data selection code Q is set to 3, it is indicated to select color dithered data and hence DIT_R data (DR data), DIT_G (DG data), and DIT B (DB data) are read respectively from the binary data buffers 315, 325, and 335 to be outputted as binary image data corresponding to red, green, and blue.

Moreover, when the data selection code Q is set to 4, it is denoted to select multi-color binary data and hence BIN_G data (BG data) is read from the buffer 305 to be outputted as binary image data corresponding to red and green. In this regard, red is set as the particular or special color in this embodiment.

In addition, when the data selection code Q is set to 5, it is designated to select multi-color dithered data and hence DIG_G data (DG data) is read from the buffer 325 to be outputted as binary image data corresponding to red and green.

In another embodiment of the image data transformation apparatus according to the present invention, there may be adopted four colors of yellow, magenta, cyan, and black in place of three colors of red, green, and blue. This system produces signals to be favorably outputted to a color printer.

In addition, there may be configured an alternative system including means for the user to externally set the mode flag Fmd and the data selection code Q.

As can be appreciated from the embodiment above, in the image data transformation apparatus according to the present invention, the type of document can be automatically determined without conducting the pre-scanning of the document so as to select an appropriate transformation method of converting the multi-value image data into binary image data.

Figure 12:
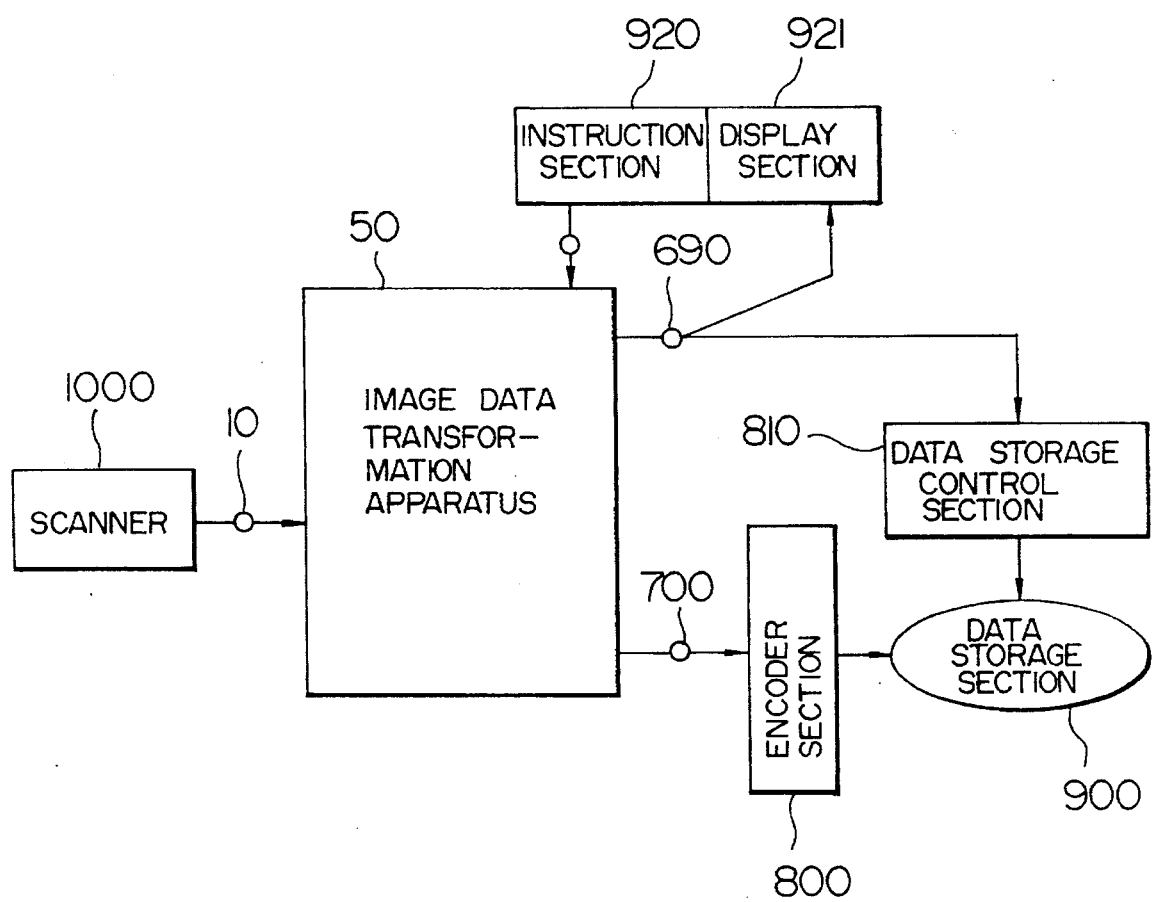
FIG. 12 is a schematic block diagram showing a first embodiment of an image entry apparatus in accordance with the present invention.

Subsequently, FIG. 12 is a block diagram showing a first embodiment of the image entry apparatus according to the present invention.

The first embodiment of the image entry apparatus according to the present invention is, so called, an image filing system. This system is constituted with a scanner 1000, an image data transformation apparatus 50, an encoder 800, a data storage control section 810, and a data storage section 900.

The scanner 1000 reads a document to produce therefrom multi-value image data, namely, YR, YG, and YB data.

The image data transformation apparatus 50 has a configuration shown in FIG. 1 or 6.

The encoder 800 receives binary image data produced from an binary image data output section 700 to compress and to encode the received data.

The data storage control section 810 receives the data selection code Q created from a data selection code output section 690 to control according to the code Q the binary image data to be stored in the storage section 900.

The data storage section 900 is implemented, for example, by an optical disk equipment.

A display section 921 displays to the operator, according to the data selection code Q from the data selection code output section 690, attribute information of the output binary image data.

The operator supplies an instruction from an instruction section 920 to arbitrarily change the binary image data to be outputted.

Figure 13:
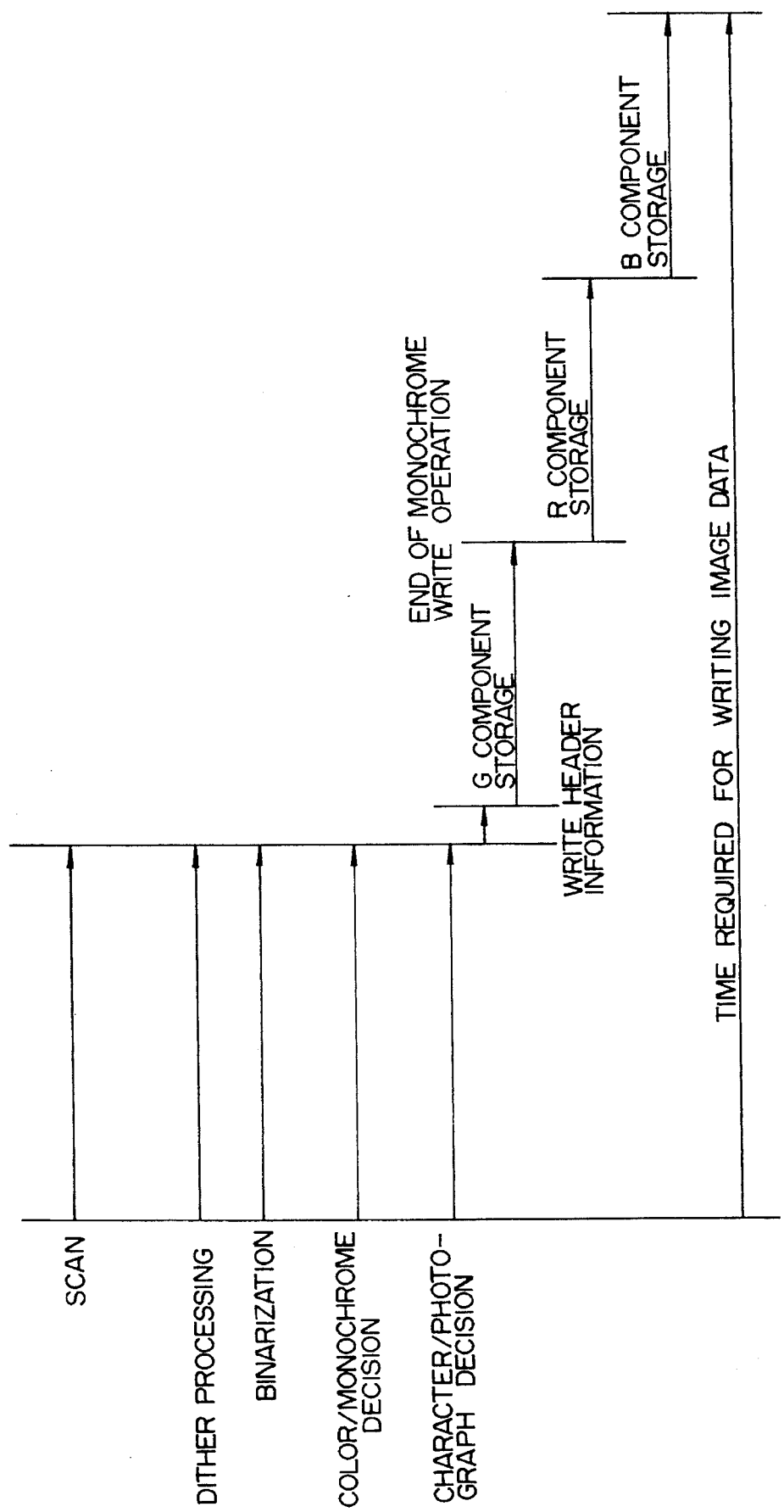
FIG. 13 is a timing chart showing a processing flow ranging from an input operation to a data accumulation.
Figure 14:
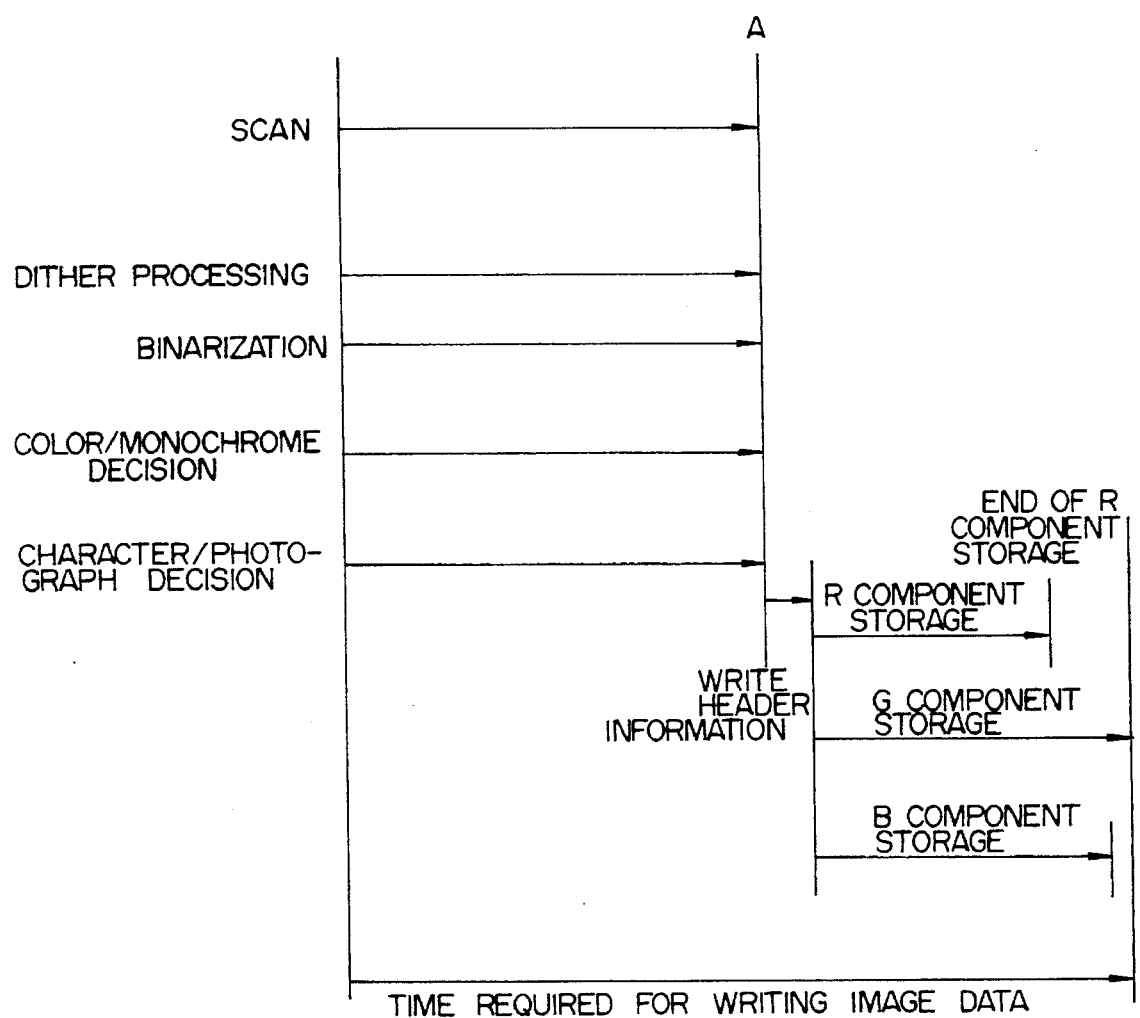
FIG. 14 is a timing chart showing another processing flow ranging from an input operation to a data accumulation.

When storing the binary image data, the red, green, blue components are sequentially or simultaneously stored. FIG. 13 is a timing chart showing the operation of the sequential data storage in a range from a document reading operation to a binary image data storage. FIG. 14 is a timing chart showing the operation of the simultaneous data storage in the same operation range.

As a second embodiment of the image entry apparatus, there may be constructed a system such as a facsimile apparatus in which the data storage control section 810 and the data storage section 900 of FIG. 12 are replaced with a data transfer control section and a data communication line, respectively.

In addition, there may also be configured a system handling a plurality of possible types of document. Namely, for any possible document types, there is produced and is stored image data associated therewith. In this case, to erase unnecessary data later according to an instruction, there is favorably used a re-writable storage medium such as an magneto-optical disk.

In accordance with the image data transformation apparatus of the present invention, the monochrome, multi-color, and full-color documents are automatically discriminated from each other. Moreover, the character and photograph regions are automatically determined. Depending on results of the decision, appropriate binary image data is selected as output data.

This consequently unnecessitates the operation in which the operator determines the type of document to specify the kind of multi-value image data and a method of transforming the data into binary image data. Furthermore, this increases the image input processing speed.

While particular embodiments of the invention have been shown and described, it will be obvious to those skilled in the art that various changes and modifications may be made without departing from the present invention in its broader aspects.

We claim:

1. An image data transformation apparatus, comprising:

binarizing means for converting image data inputted thereto into binary image data associated with a plurality of different colors;

binary image data buffer means for temporarily storing therein the binary image data;

monochrome/color decision means for deciding based on the inputted image data whether a monochrome output or a color output is to be produced; and binary image data selection/output means for reading, for the monochrome output, from said binary image data buffer means, a data item of the binary image data associated with the plural colors and for reading therefrom, converted for the color output, at least two data items of the binary image associated with the plural colors, thereby outputting the attained data;

wherein said monochrome/color decision means makes the decision based on the number of monochrome pixels and the number of color pixels in an overall area or a partial area of a frame of image of the input image data.

2. An apparatus according to claim 1, further including decision result storage means for temporarily storing therein a result of the decision made by said monochrome/color decision means, wherein said binary image data selection/output means reads and selects, for each pixel, output binary image data from said binary image data buffer means.

3. An image data transformation apparatus, comprising:

simple binarizing means for converting image data inputted thereto into binary image data with a tone thereof not being taken into consideration;

quasi-tone binarizing means for converting image data inputted thereto into binary image data with a tone thereof taken into consideration;

binary image data buffer means for temporarily storing therein the binary image data;

monochrome/color decision means for deciding based on the inputted image data whether a monochrome output or a color output is to be produced;

character/photograph decision means for deciding based on the inputted image data whether a character area output or a photograph area output is to be produced; and binary image data selection/output means for reading, for the output region detected as being both monochrome and character, from said binary image data buffer means, binary image data associated with the plural colors and converted by said simple binarizing means, for reading, for the output region detected as being both monochrome and photograph, from said binary image data buffer means, binary image data associated with the plural colors and converted by said quasi-tone binarizing means, and for reading, for the color output, from said binary image data buffer means at least two data items of the binary image data associated with the plural colors and converted by said quasi-tone binarizing means, thereby outputting the attained data;

wherein said monochrome/color decision means makes the decision based on the number of monochrome pixels, the number of color pixels, and the number of intermediate-tone pixels in an overall area or a partial area of a frame of image of the input image data.

4. An apparatus according to claim 3, further including decision result storage means for temporarily storing therein a result of the decision made by said monochrome/color decision means, wherein said binary image data selection/output means reads and selects, for each pixel, output binary image data from said binary image data buffer means.

5. An apparatus according to claim 3, further including decision result storage means for storing therein a result of the decision made by said character/photograph means, wherein said binary image data selection/output means reads and selects, for each pixel, output binary image data from said binary image data buffer means.

6. An apparatus according to claim 3, wherein said character/photograph decision means decides whether a character region output or a photograph output is to be created depending on whether or not each pixel of the input image data is of an intermediate tone.

7. An image data transformation apparatus, comprising:

binarizing means for converting image data inputted thereto into binary image data associated with a plurality of different colors;

binary image data buffer means for temporarily storing therein the binary image data;

particular color output decision means for deciding whether or not a particular color output is to be created depending on whether or not each pixel of the inputted image data is of a particular color;

monochrome/multi-color decision means for deciding based on the inputted image data whether a monochrome output or a multi-color output is to be generated; and binary image data selection/output means for reading in any cases from said binary image data buffer means a data item of the binary image data associated with the plural colors, the data item not being related to the particular color, and for reading therefrom, for the particular color output and the multi-color output, binary image data associated with the particular color in additional to the data item thus read, thereby outputting the attained data;

wherein said monochrome/multi-color decision means makes the decision based on the number of monochrome pixels and the number of particular color pixels in an overall area or a partial area of a frame of image of the input image data.

8. An apparatus according to claim 7, further including decision result storage means for temporarily storing therein a result of the decision made by said particular color output decision means, wherein said binary image data selection/ output means reads and selects, for each pixel, output binary image data from said binary image data buffer means.

9. An image data transformation apparatus, comprising:

simple binarizing means for converting image data inputted thereto into binary image data with a tone thereof not being taken into consideration;

quasi-tone binarizing means for converting image data inputted thereto into binary image data with a tone thereof taken into consideration;

binary image data buffer means for temporarily storing therein the binary image data;

particular color output decision means for deciding whether or not a particular color output is to be created depending on whether or not each pixel of the inputted image data is of a particular color;

character/photograph decision means for deciding based on the inputted image data whether a character area output or a photograph area output is to be produced;

monochrome/multi-color decision means for deciding based on the inputted image data whether a monochrome output or a multi-color output is to be produced;

binary image data selection/output means for reading, for the output region detected as being both monochrome and character, from said binary image data buffer means a data item of the binary image data associated with the plural colors and converted by said simple binarizing means and not associated with the particular color, for reading from said binary image data buffer means, for the output region detected as being both monochrome and photograph, a data item of the binary image data associated with the plural colors and converted by said quasi-tone binarizing means and not associated with the particular color, and for reading, from said binary image data buffer means, in addition to the binary image data thus read, for the particular color output and the multi-color output, the binary image data associated with the particular color, thereby outputting the attained data;

wherein said monochrome/multi-color decision means makes the decision based on the number of monochrome pixels and the number of particular color pixels in an overall area or a partial area of a frame of image of the input image data.

10. An apparatus according to claim 9, further including decision result storage means for temporarily storing therein a result of the decision made by said particular color output decision means, wherein said binary image data selection/ output means reads and selects, for each pixel, output binary image data from said binary image data buffer means.

11. An apparatus according to claim 9, further including decision result storage means for storing therein a result of the decision made by said character/photograph means, wherein said binary image data selection/output means reads and selects, for each pixel, output binary image data from said binary image data buffer means.

12. An apparatus according to claim 9, wherein said character/photograph decision means decides whether a character region output or a photograph output is to be created depending on whether or not each pixel of the input image data is of an intermediate tone.

13. An image data transformation apparatus, comprising:

binarizing means for converting image data inputted thereto into binary image data associated with a plurality of different colors;

binary image data buffer means for temporarily storing therein the binary image data;

particular color output decision means for deciding whether or not a particular color output is to be created depending on whether or not each pixel of the inputted image data is of a particular color;

color/multi-color decision means for deciding based on the inputted image data whether a color output or a multi-color output is to be generated;

binary image data selection/output means for reading, for the color output, from said binary image data buffer means at least two data items of the binary image data associated with the plural colors and for reading from said binary image buffer means, for the multi-color output and the particular color output, a data item of the binary image data, associated with the plural colors, related to the particular color and a data item of the binary image data related to another color, thereby outputting the attained data;

wherein said color/multi-color decision means makes the decision based on the number of monochrome pixels, the number of color pixels, and the number of particular color pixels in an overall area or a partial area of a frame of image of the input image data.

14. An apparatus according to claim 13, further including decision result storage means for temporarily storing therein a result of the decision made by said particular color output decision means, wherein said binary image data selection/output means reads and selects, for each pixel, output binary image data from said binary image data buffer means.

15. An image data transformation apparatus, comprising:

simple binarizing means for converting image data inputted thereto into binary image data with a tone thereof not being taken into consideration;

quasi-tone binarizing means for converting image data inputted thereto into binary image data with a tone thereof taken into consideration;

binary image data buffer means for temporarily storing therein the binary image data;

particular color output decision means for deciding whether or not a particular color output is to be created depending on whether or not each pixel of the inputted image data is of a particular color;

character/photograph decision means for deciding based on the inputted image data whether a character area output or a photograph area output is to be produced;

color/multi-color decision means for deciding based on the inputted image data whether a color output or a multi-color output is to be produced; and binary image data selection/output means for reading, for the output region detected as being both color and character, from said binary image data buffer means at least two data items of the binary image data associated with the plural colors and converted by said simple binarizing means, for reading from said binary image data buffer means, for the output region detected as being both color and photograph, at least two data items of the binary image data associated with the plural colors and converted by said quasi-tone binarizing means, and for reading, from said binary image data buffer means, in addition to the binary image data thus read, for the particular color output and the multi-color output, the binary image data associated with the particular color, thereby outputting the attained data;

wherein said color/multi-color decision means makes the decision based on the number of monochrome pixels, the number of color pixels, and the number of particular color pixels in an overall area or a partial area of a frame of image of the input image data.

16. An apparatus according to claim 15 further including decision result storage means for temporarily storing therein a result of the decision made by said particular color output decision means, wherein said binary image data selection/output means reads and selects, for each pixel, output binary image data from said binary image data buffer means.

17. An apparatus according to claim 15 further including decision result storage means for storing therein a result of the decision made by said character/photograph means, wherein said binary image data selection/output means reads and selects, for each pixel, output binary image data from said binary image data buffer means.

18. An apparatus according to claim 15 wherein said character/photograph decision means decides whether a character region output or a photograph output is to be created depending on whether or not each pixel of the input image data is of an intermediate tone.

19. An image data transformation apparatus, comprising:

binarizing means for converting image data inputted thereto into binary image data associated with a plurality of different colors;

binary image data buffer means for temporarily storing therein the binary image data;

particular color output decision means for deciding whether or not a particular color output is to be created depending on whether or not each pixel of the inputted image data is of a particular color;

monochrome/color/multi-color decision means for deciding based on the inputted image data whether a monochrome output, a color output, or a multi-color output is to be generated; and binary image data selection/output means for reading, for the monochrome output, from said binary image data buffer means a data item of the binary image data associated with the plural colors, for reading, from said binary image data buffer means, for the color output, at least two data items of the binary image data associated with the plural colors, and for reading, from said binary image data buffer means, for the multi-color output and the particular color output, a data item of the binary image data associated with the plural colors and related to the particular color and the binary image data read for the monochrome output, thereby outputting the attained data;

wherein said monochrome/color/multi-color decision means makes the decision based on the number of monochrome pixels, the number of color pixels, and the number of particular color pixels in an overall area or a partial area of a frame of image of the input image data.

20. An apparatus according to claim 19, further including decision result storage means for temporarily storing therein a result of the decision made by said particular color output decision means, wherein said binary image data selection/output means reads and selects, for each pixel, output binary image data from said binary image data buffer means.

21. An apparatus according to claim 19, wherein said plural colors are three primary colors.

22. An apparatus according to claim 21, wherein when said plural colors include green, said binary image data selection/output means first outputs binary image data of green.

23. An apparatus according to claim 19, wherein said plural colors include monochrome and three primary colors.

24. An apparatus according to claim 19, further including binary image data selection instructing means for externally supplying a binary image data selection instruction to said binary image data selection/output means.

25. An image data transformation apparatus, comprising:

simple binarizing means for converting image data inputted thereto into binary image data with a tone thereof not being taken into consideration;

quasi-tone binarizing means for converting image data inputted thereto into binary image data with a tone thereof taken into consideration;

binary image data buffer means for temporarily storing therein the binary image data;

particular color output decision means for deciding whether or not a particular color output is to be created depending on whether or not each pixel of the inputted image data is of a particular color;

character/photograph decision means for deciding based on the inputted image data whether a character area output or a photograph area output is to be produced;

monochrome/color/multi-color decision means for deciding based on the inputted image data whether a monochrome output, a color output, or a multi-color output is to be produced; and binary image data selection/output means for reading, for the output region detected as being both monochrome and character, from said binary image data buffer means a data item of the binary image data associated with the plural colors and converted by said simple binarizing means, the data item not being related to the particular color, for reading from said binary image data buffer means, for the output region detected as being both monochrome and photograph, a data item of the binary image data associated with the plural colors and converted by said quasi-tone binarizing means, the data item not being related to the particular color, for reading from said binary image data buffer means, for the output region detected as being both color and character, at least two data items of the binary image data associated with the plural colors and converted by said simple binarizing means, for reading from said binary image data buffer means, for the output region detected as being both color and photograph, at least two data items of the binary image data associated with the plural colors and converted by said quasi-tone binarizing means, and for reading from said binary image data buffer means, for the multi-color output and the particular color output, a data item of the binary image data associated with the particular color, the data item being related to the particular color and the binary image data read for the monochrome output, thereby outputting the attained data;

wherein said monochrome/color/multi-color decision means makes the decision based on the number of monochrome pixels, the number of color pixels, and the number of particular color pixels in an overall area or a partial area of a frame of image of the input image data.

26. An apparatus according to claim 25, further including decision result storage means for temporarily storing therein a result of the decision made by said particular color output decision means, wherein said binary image data selection/output means reads and selects, for each pixel, output binary image data from said binary image data buffer means.

27. An apparatus according to claim 25, further including decision result storage means for storing therein a result of the decision made by said character/photograph means, wherein said binary image data selection/output means reads and selects, for each pixel, output binary image data from said binary image data buffer means.

28. An apparatus according to claim 25, wherein said character/photograph decision means decides whether a character region output or a photograph output is to be created depending on whether or not each pixel of the input image data is of an intermediate tone.

29. An apparatus according to claim 25, wherein said plural colors are three primary colors.

30. An apparatus according to claim 29, wherein when said plural colors include green, said binary image data selection/output means first outputs binary image data of green.

31. An apparatus according to claim 25, wherein said plural colors include monochrome colors and three primary colors.

32. An apparatus according to claim 25, further including binary image data selection instructing means for externally supplying a binary image data selection instruction to said binary image data selection/output means.

33. An image entry apparatus, comprising:

document read/input means for reading a document and for inputting image data thereof;

image data transformation means for receiving as input thereto the image data and for converting the image data into binary image data, thereby outputting the binary image data, said image data transformation means including:
(a) binarizing means for converting image data inputted thereto into binary image data associated with a plurality of different colors,
(b) binary image data buffer means for temporarily storing therein the binary image data,
(c) particular color output decision means for deciding whether or not a particular color output is to be created depending on whether or not each pixel of the inputted image data is of a particular color,
(d) monochrome/color/multi-color decision means for deciding based on the inputted image data whether a monochrome output, a color output, or a multicolor output is to be generated, and
(e) binary image data selection/output means for reading, for the monochrome output, from said binary image data buffer means a data item of the binary image data associated with the plural colors, for reading from said binary image data buffer means, for the color output, at least two data items of the binary image data associated with the plural colors, and for reading from said binary image data buffer mean, for the multi-color output and the particular color output, a data item of the binary image data associated with the plural colors and related to the particular color and the binary image data read for the monochrome output, thereby outputting the attained data; and image data storage means for storing therein binary image data selection information and binary image data.

34. An image entry apparatus, comprising:

document read/input means for reading a document and for inputting image data thereof;

image data transformation means for receiving as input thereto image data and for converting the image data into binary image data, thereby outputting the binary image data, said image data transformation means including:
(a) simple binarizing means for converting image data inputted thereto into binary image data with a tone thereof not being taken into consideration,
(b) quasi-tone binarizing means for converting image data inputted thereto into binary image data with a tone thereof taken into consideration,
(c) binary image data buffer means for temporarily storing therein the binary image data, (d) particular color output decision means for deciding whether or not a particular color output is to be created depending on whether or not each pixel of the inputted image data is of a particular color, (e) character/photograph decision means for deciding based on the inputted image data whether a character area output or a photograph area output is to be produced, (f) monochrome/color/multi-color decision means for deciding based on the inputted image data whether a monochrome output, a color output, or a multicolor output is to be produced, and (g) binary image data selection/output means for reading, for the output region detected as being both monochrome and character, from said binary image data buffer means a data item of the binary image data associated with the plural colors and converted by said simple binarizing means, the data item not being related to the particular color, for reading from said binary image data buffer means, for the output region detected as being both monochrome and photograph, a data item of the binary image data associated with the plural colors and converted by said quasi-tone binarizing means, the data item not being related to the particular color, for reading from said binary image data buffer means, for the output region detected as being both color and character, at least two data items of the binary image data associated with the plural colors and converted by said simple binarizing means, for reading from said binary image data buffer means, for the output region detected as being both color and photograph, at least two data items of the binary image data associated with the plural colors and converted by said quasi-tone binarizing means, and for reading from Said binary image data buffer means, for the multi-color output and the particular color output, a data item of the binary image data associated with the particular color, the data item being related to the particular color and the binary image data read for the monochrome output, thereby outputting the attained data; and image data storage means for storing therein binary image data selection information and binary image data.

35. An image entry apparatus, comprising:

document read/input means for reading a document and for inputting image data thereof;

image data transformation means for receiving as input thereto image data, for converting the image data into binary image data, for outputting the binary image data, and for outputting attribute information of the binary image data;

image data storage means for storing therein binary image data and attribute information thereof; and binary image data attribute information display means for displaying the attribute information of the binary image data.

36. An apparatus according to claim 35, wherein said image entry apparatus is an image filing system.

37. A facsimile apparatus, comprising:

document read/input means for reading a document and for inputting image data thereof;

image data transformation means for receiving as input thereto image data, for converting the image data into binary image data, for outputting the binary image data, and for outputting attribute information of the binary image data;

means for transmitting binary image data and attribute information thereof; and binary image data attribute information display means for displaying the attribute information of the binary image data.

* * * * *